INVENTORS
EGON R. WEICKGENANNT
DONALD J. BRICKLE
SIDNEY W. BAILEY
JOHN R. MONTGOMERY

BY Theodore B Roessel
ATTORNEY

Jan. 13, 1970  E. R. WEICKGENANNT ET AL  3,489,476
DENTAL CONSOLE
Filed March 18, 1968  2 Sheets-Sheet 2

INVENTORS
EGON R. WEICKGENANNT
DONALD J. BRICKLE
SIDNEY W. BAILEY
JOHN R. MONTGOMERY

BY Theodore B. Roessel

ATTORNEY

United States Patent Office 3,489,476
Patented Jan. 13, 1970

3,489,476
DENTAL CONSOLE
Egon R. Weickgenannt, Rochester, and Donald J. Brickle, Pittsford, N.Y., and Sidney W. Bailey and John R. Montgomery, Trumbull, Conn., assignors to Sybron Corporation, a corporation of New York
Filed Mar. 18, 1968, Ser. No. 713,702
Int. Cl. A61b 19/02
U.S. Cl. 312—209                    9 Claims

ABSTRACT OF THE DISCLOSURE

Disclosed is a dental console for supporting instruments of the type requiring a supply of utility service, the instruments being nested in a module movable between a stored position within the console to conceal the instruments and an in-use position extended outwardly from the console to present the instruments for use, the flexible conduits connecting the instruments to the utility supply being stored on removable reels journaled within the console, and the reel brake for locking the reels against a rewind torque being rendered inoperative as the module moves between its in-use and stored positions and operative only when the module is at its in-use position.

BACKGROUND OF THE INVENTION

The present invention relates to a dental console and more specifically to an improved console in which the flexible utility carrying conduits are stored on removable reels journaled within the console to facilitate the rearrangement or replacement of both the conduits and the instruments carried by the console.

It is common practice in the art to mount dental instruments such as drills, syringes and aspirators on a console and to have the pneumatic and hydraulic lines, electrical cables, and vacuum lines which connect these instruments to the utility supplies, stored within the console. The most common method of storage is to pass these flexible conduits over a system of pulleys and counterweights. The pulley system provides a relatively convenient way of storing a long conduit within the console and the counterweights provide the means to retrieve any portion of the conduit pulled from the console to extend the instrument connected thereto to a point of use.

However, this pulley and counterweight arrangement has several drawbacks. For example, the length of conduit that could be stored within the console is limited by the height of the console and the number of pulleys in the system. In order to minimize the number of moving parts and the chance of the conduit becoming jammed in a complex pulley system the usual practice was to limit the number of pulleys used and depend upon the height of the console to define the length of the longest conduit which could be stored within the console. This situation, however, is not in keeping with the modern trend toward compact design.

Another drawback of the pulley and counterweight system is the difficulty in altering the array of instruments on the console or in replacing an instrument together with its attached conduit as a unit. With dental practice becoming more specialized, it is important that each dentist be able to alter or vary the type of instruments and the order or array of the instruments as they appear on the dental console. For example, while one individual dentist may want a particular instrument on one end of the array, another individual may prefer to have the same instrument on another end or in the middle of the array. Still other individuals may wish to replace one type of instrument with another or from time to time vary the order of the instruments in the array to suit his individual needs. It should be apparent that the pulley and counterweight system does not facilitate alteration since replacing conduits involves the laborious task of threading the replacement conduit through the pulley system.

One simple method of facilitating replacement or alteration of the array is to eliminate this retrieval system entirely and to simply hook the instruments on to a supporting arm and allow the conduits to hang free. However, the exposed tangle of conduits is unsightly and at times the dentist must untangle the selected instrument before bringing it into use.

Reels for storing conduits while providing a compact storage unit, as a rule, have proved unsuitable because of the difficulty in feeding the utility to the conduit stored on the reel. One reel system for example, requires attaching the receiving end of the conduit to a slip ring on the axle of the reel and then feeding the utility to the axle and then through the slip ring to the conduit. This type of reel, however, is not suitable to dental applications because the slip ring wears in use resulting in pneumatic or hydraulic leaks, loss of vacuum, or arcing where the utility being delivered is electricity.

SUMMARY OF THE INVENTION

The present invention can be characterized in one aspect thereof by the provision of a dental console in which reels journaled within the console are used for storing the flexible conduits, the reels being constructed so as to permit attachment of the receiving end of the conduit directly to the utility supply, each reel being removable to facilitate the rearrangement or replacement of conduits within the console, and having a brake which operates in cycles responsive to a successive pull and release of the conduits to lock the reel against a rewind torque; an instrument module movable between a stored position within the console and an in-use position extended outwardly from the console for supporting the instruments connected to the delivery end of the conduits; and a brake release mechanism operatively connected with the instrument module for rendering the reel brake operative only when the instrument module is at the in-use position and inoperative as the module moves between the in-use and stored positions.

OBJECTS OF THE INVENTION

One object of the present invention is to provide a dental console having reels for storing flexible utility carrying conduits within the console.

Another object of the present invention is to provide a dental console in which the reels for storing the flexible utility carrying conduits are removably mounted to facilitate the replacement or rearrangement of the conduits within the console.

A further object of the present invention is to provide a dental console having a reel retriever for storing a flexible utility carrying conduit within the console in which the conduit is in one piece and continuous from end to end having one end fixed to the utility supply and another end attached to the dental instrument.

A yet further object of the present invention is to provide a reel retriever for storing a flexible utility carrying conduit within a dental console, the reel having a brake which operates responsive to a successive pull and release of the conduit to lock the reel against the influence of a rewind torque.

Still another object of the present invention is to provide a dental console having a reel retriever system for storing flexible utility carrying conduits within the console and a movable module for releasably supporting an array of dental instruments a brake release mechanism being provided for rendering a reel brake inoperative as the module moves between an in-use position extended outwardly from the console and a stored position within the console.

These and other objects, advantages and characterizing features of our invention will become more apparent upon consideration of the following detailed description thereof when taken in conjunction with the accompanying drawings depicting the same.

DESCRIPTION OF THE PREFERRED EMBODIMENTS

Figure 1:
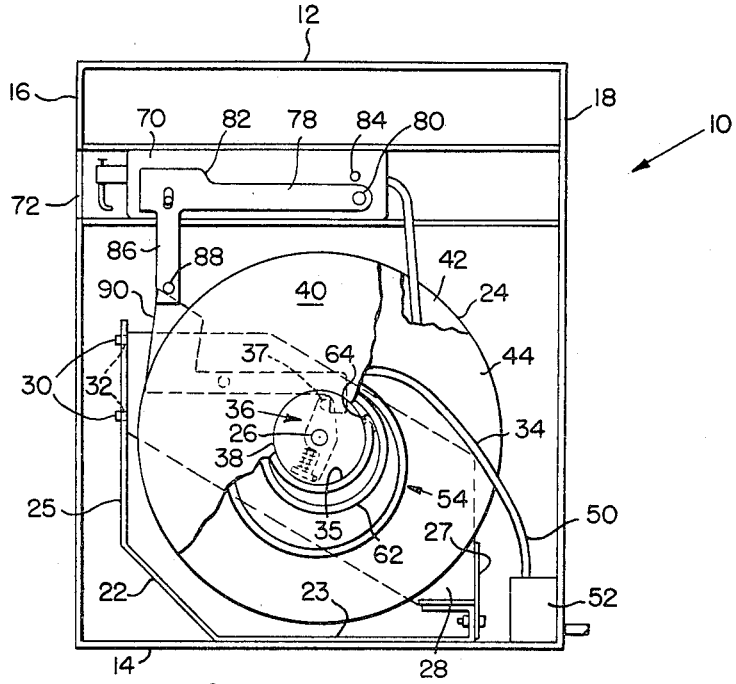
FIGURE 1 is a side elevation view of the dental console of our invention with portions broken away, showing the instrument module and flexible conduit in a stored position and the reel brake mechanism in an inoperative position.
Figure 2:
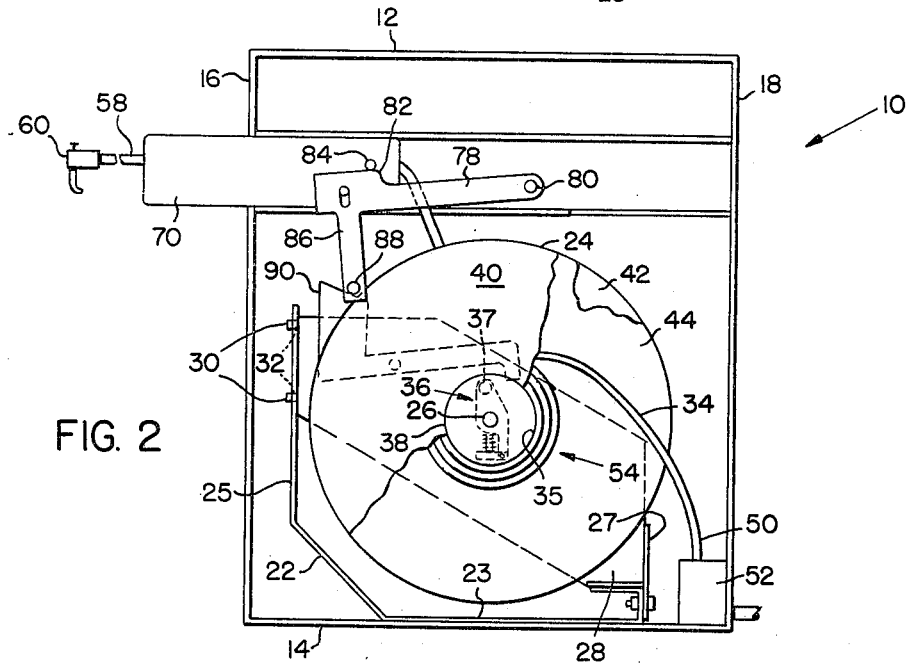
FIGURE 2 is a view similar to FIGURE 1 only showing the instrument module and flexible conduit in an extended position and the reel brake mechanism in an operative position.
Figure 3:
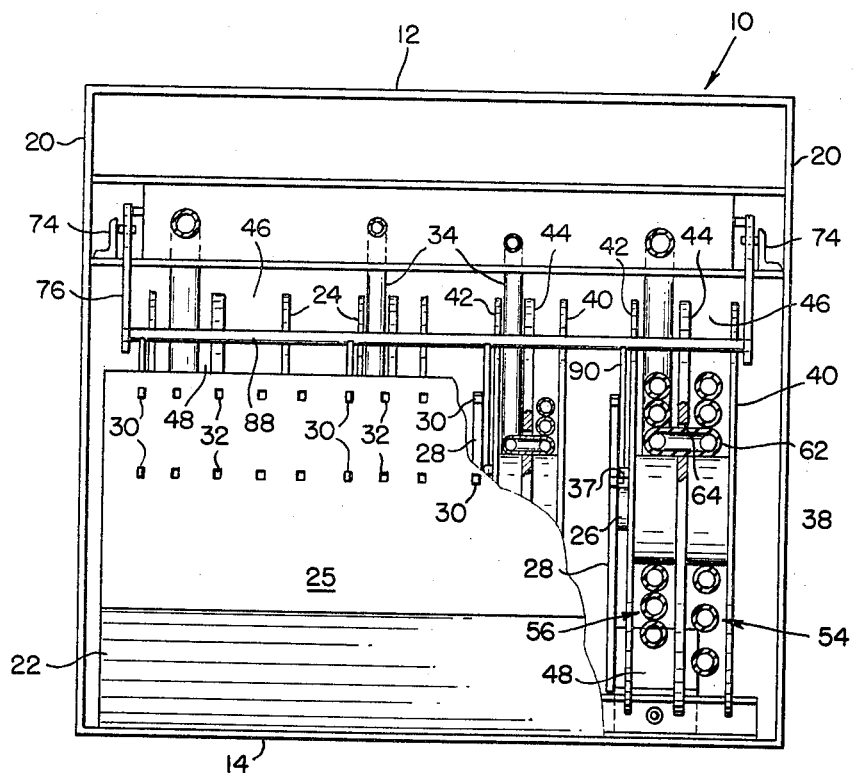
FIGURE 3 is a front view of the console with the front panel removed and portions of the reel support being broken away to show an end view of one of the reels.

Referring to the drawings, FIGURE 1 shows the console of our invention generally indicated at 10 for storing and displaying dental instruments. The console comprises a frame formed by top and bottom panels 12 and 14, front and rear panels 16 and 18 and side panels 20 (FIGURE 3). Located within the frame and fixed to bottom panel 14 is a support member 22 extending approximately the full width of the frame for releasably supporting a plurality of side-by-side storage reels 24. As viewed in FIGURES 1 and 2, support member 22 is generally U-shaped having a base portion 23 fixed to bottom panel 14 and upstanding front and rear portions 25 and 27 respectively. Each reel supported by member 22 is jounaled to an axle 26 which is fixed at one end, in cantilever fashion to a bracket member 28 which in turn is adapted to releasably connect to support member 22 by any suitable means. For example, the ends of each bracket members 28 can be provided with tabs 30 as shown in FIGURES 1–3, which snap into corresponding tab receiving slots 32 formed adjacent the end of the upstanding front portion 25 of support member 22. As shown in FIGURE 3 front portion 25 of support member 22 is provided with a plurality of spaced apart tab receiving slots 32 so as to permit relocation or replacement of reels of various widths.

Each reel 24 carries a flexible conduit 34 and is subjected to a rewind torque by any suitable means such as a watch spring (not shown) which acts to rotate the reels so as to rewind any length of conduit pulled from the reel. A brake mechanism generally indicated at 36 (FIGURES 1 and 2) associated with the hub 38 of each reel, acts to hold the reel against the influence of the rewind torque whenever a length of conduit is pulled from the reel. Brake mechanism 36 is described in detail in an earlier application Ser. No. 682,308 filed by the assignee of the present invention on Nov. 13, 1967, and reference is made to that application for the details regarding the structure and operation of the brake mechanism. It is sufficient for purposes of the present invention merely to say that brake mechanism 36 operates responsive to successive pull and release of the conduit to frictionally engage a brake drum 35 formed in hub 38 for purposes of preventing the rotation of reel 24 under the influence of the rewind torque.

As viewed in FIGURES 1–3 each reel 24 includes a pair of spaced apart wall members 40 and 42 fixed to hub 38 and an intermediate wall 44. Thus, each reel is essentially divided into a first compartment 46 defined by wall member 40 and intermediate wall 44, and a second compartment 48 defined by intermediate wall 44 and wall member 42 (FIGURE 3).

The flexible conduits 34 carried by reels 24 are continuous and unbroken from end to end having one end 50 grounded to a flow regulator 52 (FIGURES 1 and 2), a first section 54 coiled in progressively smaller loops about hub 38 in the first compartment 46, a second section 56 (FIGURE 3) coiled in progressively larger loops about hub 38 in the second compartment 48 and another end 58 (FIGURE 2) attached to a dental drill, syringe, aspirator or other instrumentation 60. As shown in FIGURES 1 and 3, the smallest loop 62 of conduit 34 in first compartment 46 passes through an opening 64 in intermediate wall 44 and into the second compartment 48 so that conduit 34 is in one piece and continuous from end 50 to 58. With this arrangement, flow regulator 52 which receives a supply of a utility (not shown) such as air, water or electricity can feed the utility directly into and through conduit 34 to the instrument 60 attached to conduit end 58 while permitting the withdrawal of conduit section 56 from the reel in a manner described hereinbelow.

Instruments 60 are nested in an instrument module 70 which is slidably mounted within the console frame. Module 70 is slidable with respect to the frame so that the module can be moved to either a stored position within the housing as shown in FIGURE 1, wherein a door member 72 conceals the instrumentation, or to an extended in-use position as shown in FIGURE 2 wherein the instruments 60 nested in the module are openly displayed.

A pair of brackets 74 are fixed within the upper portion of the frame on either side of module 70 (FIGURE 3) and adjacent side panels 20. Each bracket carries a generally L-shaped cam member 76 which has one leg 78 pivoted at 80 (FIGURES 1 and 2) to bracket 74 and extending generally parallel with the path of travel of instrument module 70. Leg 78 has a cam surface 82 thereon, remote from pivot 80, which is engaged by a cam roller 84 carried by the instrument module for purposes set out hereinbelow. Each cam member 76 also has a downwardly depending leg 86 which carries one end of a bar member 88 extending between the cam members. Bar 88 is adapted to abut a linkage 90 pivoted to bracket 28 and engageable with a portion 37 of brake mechanism 36 for purposes of rendering brake mechanism 36 inoperative whenever cam member 76 is moved counterclockwise about pivot 80 as viewed in FIGURES 1 and 2.

Referring now to FIGURE 1, we shall describe the operation of our invention beginning with instrument module 70 stored within the console housing. In this position all the flexible conduits 34 are fully wound on their respective storage reels 24 and linkage 90 is engaged with a portion 37 of brake mechanism 36 to hold the brake in an inoperative position.

When it is desired to move instrument module 70 to an in-use position, door 72 is first opened to permit access to the instrument module. The module is moved manually or hydraulically by any suitable means (not shown), to an in-use position shown in FIGURE 2. In moving the module to the in-use position, a small portion of the second section 56 of the flexible conduit is pulled from each reel 24 which causes the reels to rotate counterclockwise as viewed in FIGURES 1 and 2, the nesting of instruments 60 in instrument module 70 preventing the rewind torque from rotating the reels so as to retrieve this portion of extended conduit.

As the module is moved to the in-use position, cam roller 84 travels along legs 78 of the cam members 76 and eventually engages cam surface 82 which causes the cam member to pivot downwardly about its pivot 80. As cam member 76 pivots downwardly, bar 88 is brought into abutment with linkage 90 causing the linkage to rotate about its pivot thereby releasing the linkage from engagement with a portion 37 of brake mechanism 36 to render the brake mechanism operative. Now any further pull or release of the flexible conduits 34 will operate brake mechanism in a manner set out in the above mentioned earlier filed application Ser. No. 682,308.

With the instrument module in an in-use position, the dentist can select any instrument from the array carried by the module and bring that instrument, as for example, a drill, syringe or aspirator, into a zone of use simply by unnesting and pulling the instrument from the module as shown in FIGURE 2. When the instrument is pulled from the module, the attached conduit is also pulled which unwinds all, or a portion of the second section 56 of the conduit from the reel. As set forth hereinabove, withdrawing the hose from the reel rotates the reel counterclockwise as viewed in FIGURES 1 and 2 which in turn causes section 54 of the conduit stored in loose coils in the first compartment 46 to tighten about hub 38 as shown in FIGURE 2 while end 50 of the conduit remains grounded to flow regulator 52. When the reel rotates clockwise to retrieve the withdrawn conduit section 56 into second compartment 48, conduit section 54 in the first compartment 46 merely loosens its coils as shown in FIGURE 1. Thus, section 54 of the conduit coiled about hub 38 in the first compartment 46 simply tightens or loosens its coils as section 56 of the conduit is respectively pulled from or retrieved onto reel 24.

When it is desired to move instrument module 70 back to a stored position the module is simply pushed into the console housing. As the module begins to move into the housing cam roller 84 disengages from cam surfaces 82 allowing cam member 76 to pivot upwardly about its pivot 80. This in turn releases the abutment between bar 88 and linkage 90 allowing the linkage to pivot into engagement with a portion 37 of brake mechanism 36 thereby rendering the brake mechanism inoperative. Now, as the module is pushed farther into the housing, reels 24 will rotate in concert under the influence of the rewind torque to reel in the small portion of hose that was extended when the module was initially moved to the in-use position.

If for any reason the dentist wishes to alter the instrument array carried by instrument module 70, the instrument which the dentist desires to move and the reel and conduit associated with that instrument can be quickly and easily removed from the console in the following manner.

First, the rear panel 18 is removed to permit access to the interior of the console and reels 24. The particular instrument to be removed is then unnested from module 70 and removed through the back of the console. The conduit attached to this instrument is disconnected from flow regulator 52 and bracket member 28 lifted to unsnap tabs 30 from the corresponding tab receiving slots 32 in support member 22. The bracket together with the reel journaled to the bracket, the conduit stored on the reel, and the instrument is then removed through the rear of the console. A replacement reel can be inserted into the vacated space and a different instrument installed simply by reversing the process.

Thus, it will be appreciated that the present invention accomplishes its intended objects providing a dental console which utilizes a reel for storing dental hoses and the like in a compact unit. The unique feature of the double compartment of the reels described herein permits attaching one end of the conduit stored on the reel directly to the utility and eliminates the need for slip rings. Furthermore, the action of cam member 76 and linkage 90 as the instrument module is moved from an in-use position provides the means for rendering the brake mechanism inoperative so that all reels will rotate simultaneously under the influence of the rewind torque to rewind the small portion of conduit initially pulled from the reel when the module was moved to its in-use position.

Furthermore, since any instrument, conduit and storage reel can be removed quickly and easily from the console as a unit, the task of replacing instruments or altering the order of the instruments on module 70 is greatly facilitated. Thus, with a console of the present invention a dentist can rearrange the instrumentation in the console to suit his individual needs, insert seldom used highly specialized instruments into the instrument array when needed or replace old or damaged instruments quickly and with a minimum effort.

While we have described a preferred embodiment of our invention in detail, it should be readily apparent to one skilled in the art that various modifications can be made therein without changing the spirit and scope of the invention.

Having thus described our invention in detail, what we claim as new is:

1. A console for supporting instruments of the type requiring a supply of utility service comprising, in combination:
   (a) a frame;
   (b) a moveable instrument module carried by said frame for releasably supporting said instruments, said instrument module being moveable between a stored position within said frame and an in-use position extending outwardly from said frame;
   (c) a generally U-shaped support member within said frame, said support member having a base portion and upstanding front and rear portions;
   (d) a plurality of bracket members having the ends thereof releasably supported by said support member;
   (e) a storage reel journaled to each of said bracket members;
   (f) a flexible conduit stored on each of said reels and connecting said instruments to said supply of utility service to provide for the extension of said instrument from said module:
   (g) means for applying a rewind torque to said reel when any portion of said flexible conduit is pulled therefrom;
   (h) a brake cooperating with each reel for locking said reels against the influence of said rewind torque; and
   (i) a linkage operatively connected with said instrument module and said brake for rendering said brake inoperative only when said instrument module is at said in-use position extended outwardly from said frame.

2. A console for supporting instruments of the type requiring a supply of utility service comprising, in combination:
   (a) a frame;
   (b) an instrument module carried by said frame for releasably supporting said instruments;
   (c) a support member within said frame;
   (d) a flexible conduit connecting each of said instruments to said supply of utility service to provide for the extension of said instruments from said module, said conduits being continuous and unbroken from end to end having one end thereof connected to said supply of utility service and the second end thereof connected to one of said instruments;
   (e) storage reels supported by said member, each of said reels comprising:
      (i) a hub
      (ii) a pair of spaced apart side walls fixed to said hub, and
      (iii) a third wall intermediate said side walls for dividing the space between said side walls into a first compartment for receiving a first section of said flexible conduit and a second compartment for receiving a second section of said flexible conduit, said third wall having an opening therethrough to permit the passage of said flexible conduit from said first compartment to said second compartment;
   (f) means for applying a rewind torque to said reels when any portion of said flexible conduit is pulled therefrom; and (g) a brake cooperating with each reel for locking said reels against the influence of said rewind torque.

3. The combination as set forth in claim 2 in which a plurality of said storage reels are supported side by side by said support member.

4. A console for supporting instruments of the type requiring a supply of utility service, comprising in combination:
  (a) frame;
  (b) a movable instrument module carried by said frame for releasably supporting said instruments, said instrument module being movable between a stored position within said frame and an in-use position extending outwardly from said frame;
  (c) a support member within said frame;
  (d) storage reels supported by said support member;
  (e) a flexible conduit stored on each of said reels and connecting said instruments to said supply of utility service to provide for the extension of said instruments from said module;
  (f) means for applying a rewind torque to said reels when any portion of said flexible conduit is pulled therefrom;
  (g) a brake cooperating with each reel for locking said reels against the influence of said rewind torque; and
  (h) a linkage operatively connected with said instrument module and said brake for rendering said brake operational only when said instrument module is at said in-use position extended outwardly from said frame, said linkage including,
    (i) movable members each having one end thereof engageable with one of said brakes, said members being movable to a first position to render said brake operative and a second position to render said brake inoperative, and
    (ii) means for moving said movable members to said first position when said instrument module is at said in-use position extending outwardly from said frame, whereby said brakes are rendered operative.

5. A console for supporting instruments of the type requiring a supply of utility service comprising:
  (a) a frame for releasably supporting said instrument;
  (b) a generally U-shaped support member within said frame, said support member having a base and upstanding front and rear portion;
  (c) a purality of brackets releasably supported adjacent their ends by the upstanding front and rear portions of said support member;
  (d) a storage reel journaled to each of the said brackets;
  (e) a flexible conduit stored in each of said reels and connecting said instruments to said supply of utility service to provide for the extension of said instruments from said frame;
  (f) means for applying a rewind torque to said reels when any portion of said flexible conduit is pulled therefrom; and
  (g) a brake cooperating with each reel for locking said reels against the influence of said rewind torque.

6. The combination as set forth in claim 4 in which said means for moving said members comprises:
  (a) an arm pivotally connected to said frame;
  (b) means on one end of said arm engageable with each of said movable members for moving said member to said first position; and
  (c) means actuated by said instrument module for pivoting said arm, and therefore the means thereon, into engagement with said members when said instrument module is at said in-use position extended outwardly from said frame.

7. The combination as set forth in claim 6 in which said arm is generally L-shaped having one leg pivoted to said frame and a depending leg for supporting said means engageable with each of said movable members.

8. The combination as set forth in claim 7 in which one of said generally L-shaped arms is provided on either side of said instrument module, and said means on said depending leg for engaging each of said members comprising a rod supported by and extending between said depending legs.

9. The combination as set forth in claim 8 in which at least one of said arms has a cam surface on the pivoted leg thereof remote from said pivot, said means actuated by said instrument module for pivoting said arms comprising a cam follower adapted to ride on the pivoted leg of said generally L-shaped arms as said module moves from said stored position to said in-use position, the engagement of said cam roller with said cam surface causing said arms to pivot said rod into engagement with said members.

References Cited

UNITED STATES PATENTS

| 2,371,597 | 3/1945 | Angell | 32—22 |
| 2,393,511 | 1/1946 | Beede | 242—107.6 |
| 3,280,458 | 10/1966 | Deeley et al. | 32—22 |
| 3,180,585 | 4/1965 | Pusey et al. | 32—22 |

CASMIR A. NUNBERG, Primary Examiner

U.S. Cl. X.R.

32—22; 242—107.3